C. C. DEDREUX.
TRAMMEL GAGE FOR VEHICLE WHEELS.
APPLICATION FILED OCT. 21, 1914.
1,138,736.
Patented May 11, 1915.
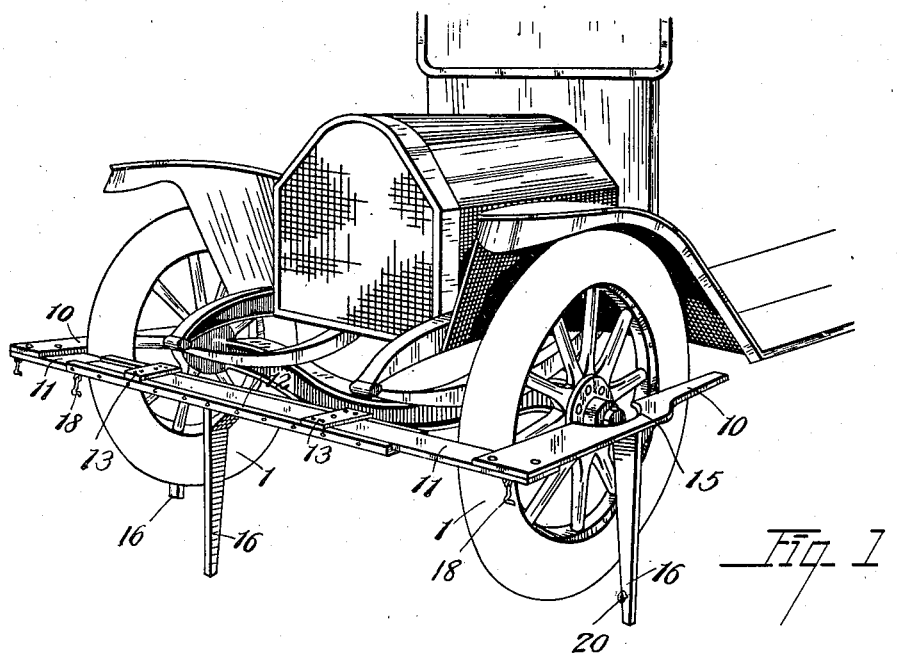
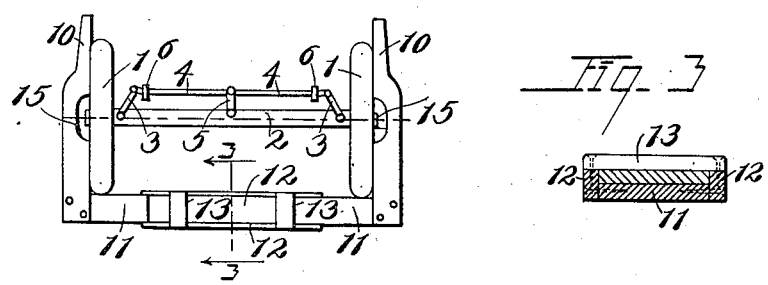
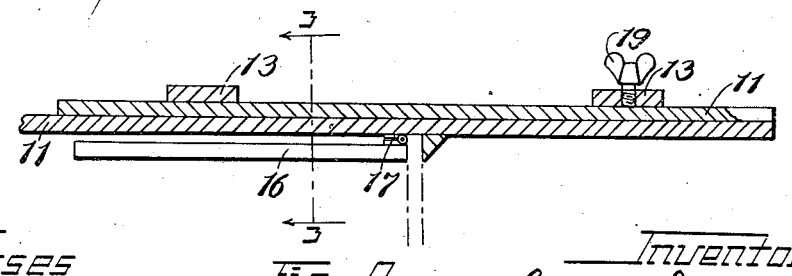
Inventor
Chas. C. Dedreux
By Hull & Smith
Attys.

UNITED STATES PATENT OFFICE.

CHARLES C. DEDREUX, OF CLEVELAND, OHIO.

TRAMMEL-GAGE FOR VEHICLE-WHEELS.

1,138,736.        Specification of Letters Patent.        Patented May 11, 1915.

Application filed October 21, 1914. Serial No. 867,711.

*To all whom it may concern:*

Be it known that I, CHARLES C. DEDREUX, a citizen of the United States, residing at Cleveland, in the county of Cuyahoga and State of Ohio, have invented a certain new and useful Improvement in Trammel-Gages for Vehicle-Wheels, of which the following is a full, clear, and exact description, reference being had to the accompanying drawings.

This invention comprehends a gage or instrument whereby the wheels of vehicles may be trued up and brought into alinement. In the case of a vehicle having solid axles like the usual horse drawn carriage, or even the rear axle of an automobile, the lack of axial alinement of the wheels is generally predicated upon some outside cause of such magnitude as to render its existence immediately apparent and its cure a matter of absolute necessity. Thus in the case of the rear wheels of an automobile which are usually journaled upon the ends of a rigid axle, a lack of alinement would be instantly observable by difficulty with the driving shaft. However, in a case where the wheels are intentionally movable about different pivots as in the front wheels of an automobile there has never been any means for testing their alinement excepting the awkward expedient of measuring across the car from point to point, and this has been a matter of much difficulty owing to the obstruction caused by the car body that it has been seldom attended to by repairers and garage men, the naked eye being trusted to secure a reasonable amount of alinement. However, a small difference of alinement has a very serious effect upon the tire mileage, particularly in the case of large trucks in which solid tires are used and in which abrasion caused by a misalinement of the front wheels will frequently reduce the tire mileage from fifty to seventy-five per cent. or even more from what it normally should be.

The object of this invention is the provision of a simple, reliable, economical and easily operated appliance whereby the front wheels of an automobile (or other independently pivoted wheels) may be brought into alinement with each other.

Generally speaking my invention may be defined as consisting of the combinations and constructions recited in the claims hereto annexed and illustrated, in one embodiment, in the drawings accompanying and forming a part of this application, wherein—

Figure 1 is a perspective view of the forward part of an automobile illustrating the mode of use of my appliance; Fig. 2 is a top plan view of my improved gage showing the same in operative relation with the vehicle wheels; Fig. 3 is an enlarged cross-sectional view corresponding substantially to the line 3—3 of Figs. 2 and 4 but showing a slightly modified construction; and Fig. 4 is a longitudinal, sectional view through the adjustment parts.

Describing the parts by reference characters 1—1 represents the front wheels of an automobile, the same being pivoted for deflection about vertical axes at opposite ends of the front axle 2 as is common in present day constructions. The spindles or stub-axles upon which these wheels are pivoted are provided with projecting arms 3—3 to which are connected the links 4—4 pivoted to the end of the steering arm 5 as shown in Fig. 2. For the purpose of adjusting the angle of the wheels relatively to the vehicle for steering purposes suitable devices 6—6 are employed in connection with these rods and arms, as will be well understood to those skilled in the art. Of course the particular arrangement of members is unimportant to the present invention.

My improved gage comprises a pair of spaced horizontal arms 10—10 having their inner faces straight and held accurately parallel to each other in all positions of adjustment. These arms are connected to bases 11—11 perpendicular to said arms, arranged for relative longitudinal movement to accommodate cars of different width, suitable provision being made for keeping them always in alinement with each other. In the present embodiment one of the bases is provided with side pieces 12—12 defining a channel in which the other base member slides, suitable cross members 13—13 being employed to maintain them adjacent each other and to produce the amount of friction necessary to maintain the parts in adjusted position.

The length of the arms is made at least as great as the diameter of the wheels so as to enable measurements to the rim or tire to be made at both sides of the hub.

The inner edges of the arms 10—10 are preferably notched as shown at 15 so as to avoid coming into engagement with the wheel hubs, and the device is preferably provided with legs 16—16 adapted to hold the same in horizontal position, the length of the same being such that the arms will come approximately at the center of the average sized wheel, though the height at which the gage is held is comparatively unimportant provided only that it is held parallel to the plane containing the axles of the car. These legs are preferably hinged in place as shown at 17 so as to permit their being folded as shown in Fig. 4 and fastened with hooks 18 which engage suitable eyes 20.

In use the device is presented to the forward wheels of an automobile as illustrated in Fig. 1, being supported either upon the legs 16 or other suitable foundation with the base 11 engaging the tires of both wheels. The arms 10—10 being at all times perpendicular to said base and parallel to each other it is obvious that the wheels can easily be brought to the same plane. This is done by setting the steering wheel to its central position and afterward increasing or decreasing the length of the links 4—4 by means of the adjustments always provided therewith until measurements from these arms show that the wheels are in exact parallelism. In fact for most cases it is sufficient merely to apply the device in the manner described and note whether the arms make contact with both tires at both sides of the hub when the steering wheel is in neutral position, thus insuring that when the machine is run directly ahead the wheels will have a true rolling motion without any grinding or side slip.

Ordinarily the friction between the members 11—11 will be sufficient to hold the device in position for use, and the legs 16 will support it so that one man can do all the work necessary. However, it is very easy to apply a supplemental securing means if desired such as the thumb screw 19 shown in Fig. 4.

I do not confine myself to the particular arrangements and constructions herein illustrated except as the same are recited in the claims hereto annexed.

Having thus described my invention, what I claim is:—

1. A gage for truing up vehicle wheels comprising a pair of spaced parallel arms adapted to engage the faces of opposite wheels of the vehicle, the length of the arms being greater than the diameter of said wheels, a common base for said arms, said arms being arranged for adjustment toward and from each other, and means for supporting said arms in a horizontal position substantially midway of the height of the wheels.

2. A gage for truing up vehicle wheels comprising a pair of spaced parallel arms adapted to engage the face of opposite wheels of the vehicle, the length of the arms being greater than the diameter of said wheels, and the inner edges of said arms being notched, and a common base for said arms, said arms being arranged for adjustment toward and from each other.

3. A gage for truing up vehicle wheels comprising a pair of spaced parallel arms adapted to engage the face of opposite wheels of the vehicle, the length of the arms being greater than the diameter of said wheels, a base member rigidly attached to each arm and extending perpendicularly thereto, means securing said base members together in longitudinally adjustable relation, and means for supporting said arms in horizontal position midway of the height of the wheels.

4. A gage for truing up vehicle wheels comprising a pair of spaced parallel arms adapted to engage the face of opposite wheels of the vehicle, the length of the arms being greater than the diameter of the wheels, a common base for said arms, said arms being arranged for adjustment toward and from each other, and legs attached to said arms and base and adapted to support the same horizontally.

In testimony whereof, I hereunto affix my signature in the presence of two witnesses.

CHAS. C. DEDREUX.

Witnesses:
BRENNAN B. WEST,
HAROLD S. SMITH.